Jan. 25, 1966  D. FISHER  3,230,624
DESIGNS INSTRUMENTS OR APPARATUS
Filed July 24, 1964  2 Sheets-Sheet 1
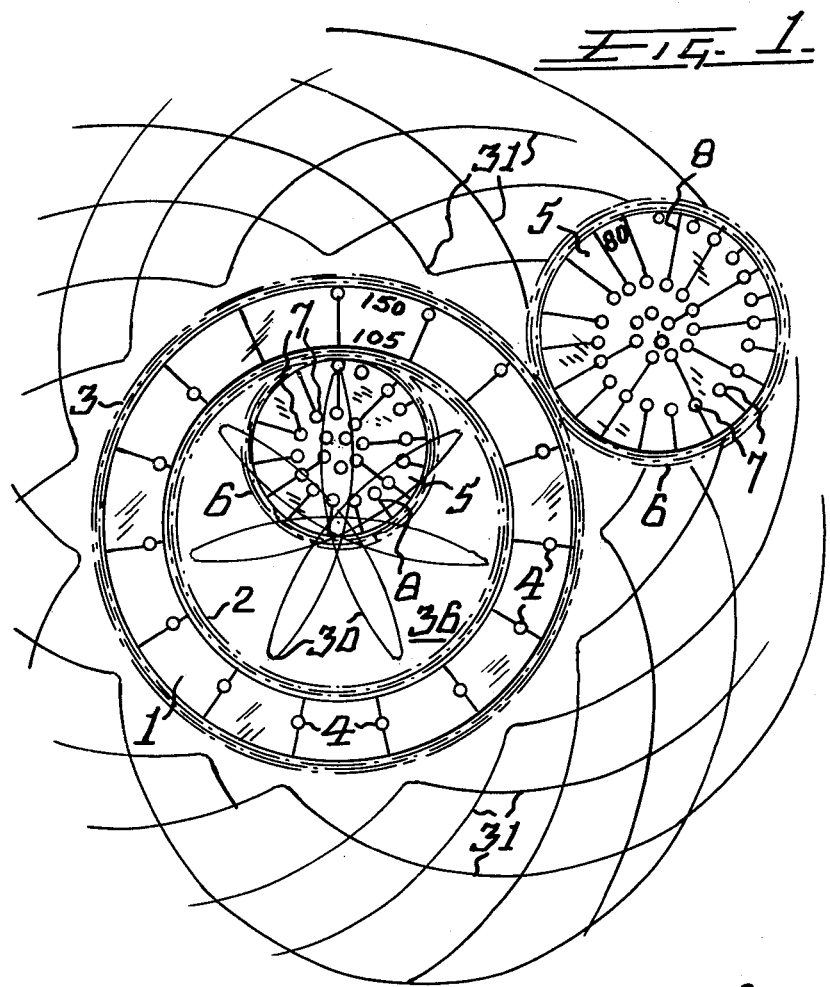
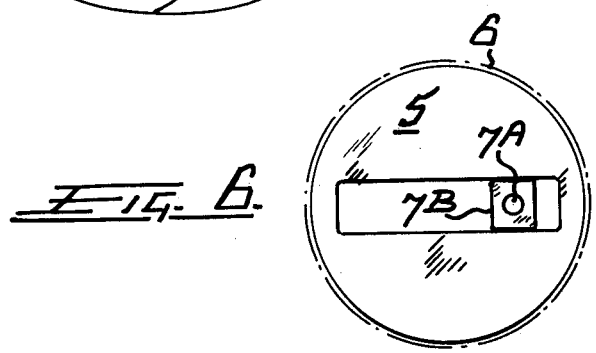
INVENTOR:-
DENYS FISHER
ATTORNEY:-

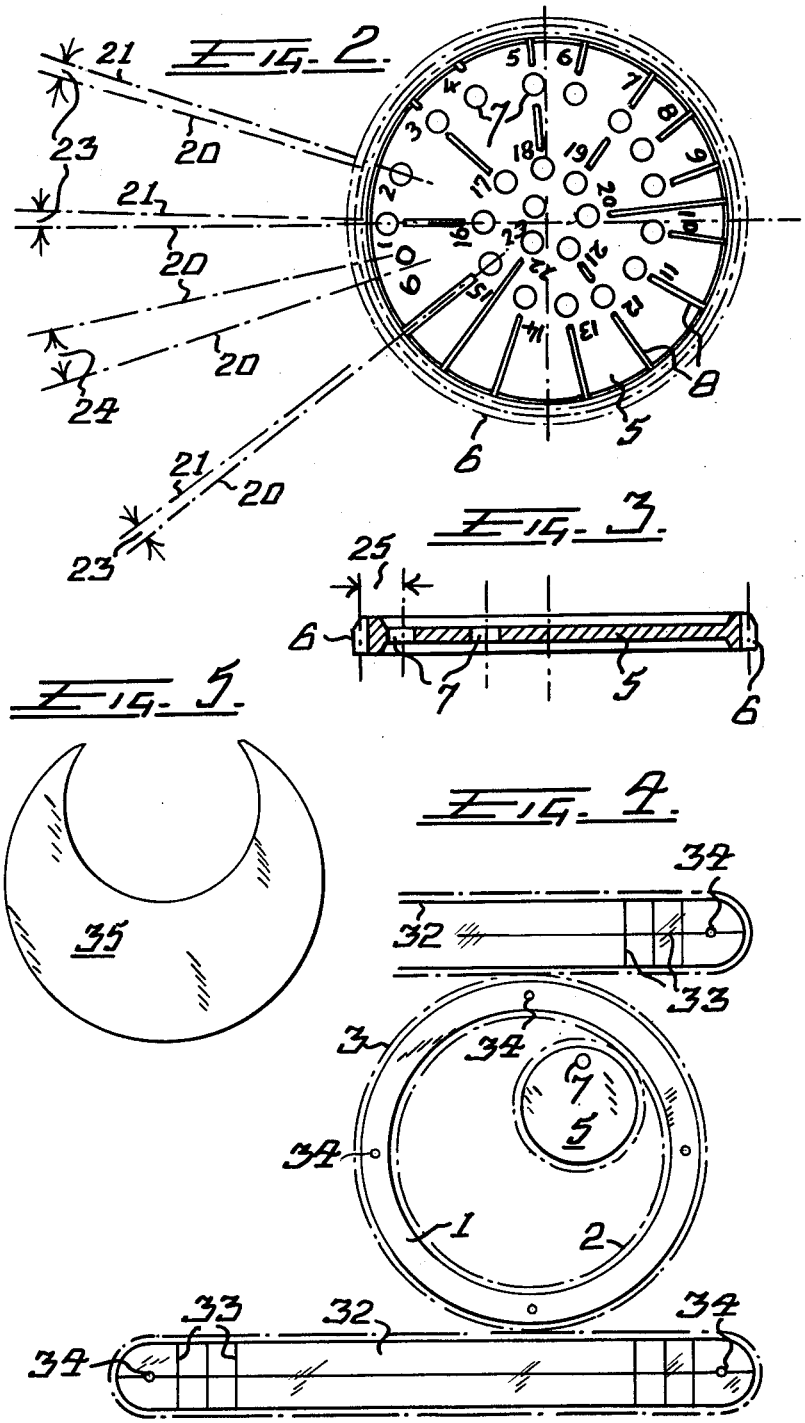

United States Patent Office 3,230,624
Patented Jan. 25, 1966

3,230,624
DESIGNS INSTRUMENTS OR APPARATUS
Denys Fisher, 8 Nook Road, Scholes, Leeds, England
Filed July 24, 1964, Ser. No. 384,968
2 Claims. (Cl. 33—27)

The invention has as its object the provision of new or improved designs instruments or apparatus whereby users thereof may quickly and easily produce designs or patterns of an epicyclic or like nature upon any suitable material or surface. The designs or patterns for instance may be applied to paper or other surfaces by employing a pen, stylo, scraper or graver and the said instrument or apparatus may be employed for industrial or for educational purposes or for amusement.

Broadly, the instrument or apparatus includes a toothed primary member or members, a toothed secondary member or members and a pen, scraper, graver or like device, the secondary member or members being adapted to be manipulated relative to the primary member or members or vice versa whereby the pen or like device is caused to draw, scrape or engrave an epicyclic or like design upon a co-acting piece of paper, board or other suitable material, means being associated for varying or altering the orientation of the pen or the members to produce various designs or patterns.

According to the invention the designs instrument or apparatus comprises an internally toothed ring or primary member or members and an externally toothed disc or secondary member or members which latter member or members is or are furnished with a single aperture or a plurality of apertures for accommodating a pen, pencil or like device whereby when the teeth of the members are in mesh the pen or like device serves as a driver for the secondary member relatively to the primary member and simultaneously draws or inscribes a design upon the surface supporting the apparatus. The said aperture or apertures may be formed actually in the secondary member or members or it or they may be formed in a block or slider adjustably attached to the secondary member or members.

In order that the invention may be fully and clearly comprehended the same will now be described with reference to the accompanying drawings, in which:

FIGURE 1 is a plan of a primary member and two secondary members according to the invention, illustrating possible manners of locating the latter members relative to the former one, there also being depicted two simple designs or patterns produced with the aid of the apparatus.

FIGURE 2 is a plan of a secondary member and a method of marking-out and constructing the same.

FIGURE 3 is an end view of FIGURE 2.

FIGURE 4 is a plan of two rack members for use with a primary and a secondary member according to the invention.

FIGURE 5 is a plan of an ancillary device for use with the apparatus illustrated in the previous views.

FIGURE 6 is a diagrammatic plan of a modified secondary member.

The primary member consists of a ring or annular disc 1 furnished with internal teeth 2 and external teeth 3. Also formed in the ring 1 is a plurality of apertures 4 arranged in predetermined spaced relationship both circumferentially and radially. For instance, the apertures are spirally disposed. These apertures are provided to enable the primary member to be used as a secondary member when so required.

The secondary member comprises a circular disc 5 furnished with a row of external teeth 6 and a plurality of apertures 7 arranged in any desired spaced relationship. Member 5 is of less diameter than the toothed bore of the member 1 but all sets of teeth are of similar size and pitch.

In the simple embodiment of apparatus illustrated in the drawings where all the members that can be used as secondary members have a circular externally toothed periphery, the apertures 7 and 4 in each member are arranged with a specially preferred spaced relationship in a spiral manner and so that:

(a) Each successive aperture 7 in the spiral relationship is progressively closer to the geometric centre of the member by an equal and standard difference in radial position.

(b) The geometrical centres of the apertures lie on radial lines which intersect the external tooth form of the periphery at points which are one quarter of the pitch of the teeth distant from the centre of a tooth.

(c) The outermost aperture is a constant distance from the externally toothed periphery of each member.

(d) Each aperture in the spirally spaced relationship is numbered consecutively starting with No. 1 for the outermost aperture.

(e) Visible radial lines 8 are marked on the member leading outwards from each aperture to the externally toothed periphery for ease in positioning the secondary member in relation to the primary member.

(f) The primary and secondary members are preferably manufactured from a transparent or translucent material.

In the FIGURES 1 and 2 examples of a secondary member the latter has 60 teeth, 20 are the centre lines of some teeth, 21 are the centre lines of certain apertures 7 and the distance 23 is one quarter of the angular pitch 24.

Any number of secondary disc members 5 and rings 1 of different sizes may form part of the apparatus but it is preferred that the outermost aperture 7 and 4 of each disc and ring respectively is arranged at a constant or similar distance 25 from the pitch line of the teeth 6, see FIGURE 3.

To use the apparatus a primary member 1 is placed upon a sheet of paper, for instance, and the teeth 6 of a secondary member 5 placed in mesh with the internal teeth 2 of the primary member as shown in FIGURE 1. A preferably ball-pointed pen or a pencil or scriber is then held in the hand of a user with the writing end of the pen located in an aperture 7 of the member 5 and in contact with the paper. The pen (not shown) is then manipulated to serve as a driving member for the disc 5 round the teeth of the member 1 to inscribe a design, see 30 in FIGURE 1.

Alternatively, a member 5 may be placed in mesh with the external teeth of the member 1 (see FIGURE 1) and a pen or like instrument similarly used to drive the member 5 round the teeth 3 of the member 1 to produce a design such as 31.

Different patterns or designs may be achieved by orienting the pen in another of the apertures in the secondary member or one kind of pattern may be superimposed upon another.

Instead of the toothed internal bore and the toothed external peripheral of the primary member being circular they may be elliptical straight sided with rounded ends or be otherwise suitably contoured, for example, with an undulating outline and the periphery of the secondary member too may be elliptical, undulatory or otherwise.

By arranging the plurality of apertures in the circular secondary members as described above it is possible to use the equipment to build up compound patterns of curves superimposed on one another and to ensure that each separate curve is exactly in register with all others both in the radial and angular position of the outermost points of the curve provided that the pen is used in the same numbered aperture in each member.

It is further possible to draw a curve using, say, aperture No. 1 in any member, and then by turning the member over so that its lower face is now uppermost to draw a further curve, using aperture No. 1, that is angularly displaced from the previous curve by an amount equal to half the angular pitch of the teeth on the periphery of the primary member. This feature is particularly useful when using a primary member with an odd number of teeth so that curves can be drawn which are exactly opposite one another or displaced exactly one half turn.

By also employing a toothed rack or racks 32 in an arrangement of members such as is shown in FIGURE 4, operating the inner or secondary members 5 as aforesaid and notching forward the member 1 one or more teeth of the rack after each drawing operation, other kinds of designs may be executed.

33 are datum or guide lines for facilitating setting operations and 34 are orifices for accommodating drawing pins for temporarily securing parts to drawing boards or like surfaces.

To facilitate operation of the parts of the apparatus an ancillary device 35 (FIGURE 5) of crescent or other suitable shape may be provided arranged to nest within the similarly shaped space 36 when the apparatus is assembled as in FIGURE 1.

Regarding the FIGURE 6 example of secondary member 5, instead of or in addition to apertures 7 being formed therein, an aperture 7A is formed in a member 7B housed in a slot in the member 5 whereby the aperture 7A may be radially adjusted.

Means such as clamps, magnets or other suitable devices could be associated with the primary member for securing it in position during use. Alternatively, the said member or more than one could be arranged in a frame in a preferably adjustable manner. Or other means could be provided for supporting, steadying or guiding the apparatus during use or for traversing paper or work pieces relative to the instrument.

The invention may be made up in the form of sets of differently sized and shaped primary and secondary members and may include pens of differently coloured inks, or means for subsequently colouring, shading or hatching any designs prepared with the aid of the instrument.

I claim:

1. A design drawing device comprising in combination: an internally toothed primary ring member; an externally toothed secondary disc-shaped member, said secondary member having a plurality of apertures for accommodating a drawing instrument; said plurality of apertures being spaced apart at different distances from the center of said secondary member; the teeth of said primary and secondary members being in mesh; said drawing instrument being placed in one of said apertures in said secondary member and serving as the driving means to move said secondary member relative to the inner periphery of said primary member; the moving of said drawing instrument simultaneously maintaining the primary and secondary members in mesh and drawing a design upon a surface supporting the drawing device; and a plurality of apertures in said primary ring member each of which is at a different distance from the center of the primary member and each of said apertures in the primary member being at a predetermined distance from the internal tooth line of the external teeth of the primary member.

2. A design drawing device comprising in combination: an internally toothed primary ring member; an externally toothed secondary disc-shaped member, said secondary member having a plurality of apertures for accommodating a drawing instrument; said plurality of apertures being spaced apart at different distances from the center of said secondary member; the teeth of said primary member and said secondary member being in mesh; said drawing instrument being placed in one of said apertures in said secondary member and serving as the driving means to move said secondary member relative to the inner periphery of said primary member; the moving of said drawing instrument simultaneously maintaining the primary and secondary members in mesh and drawing a design upon a surface supporting the drawing device; and a plurality of apertures in said primary ring member which are at different distances from the center of the primary member with each of said apertures in the primary member being on the center line of a tooth in the external teeth row of the primary member.

References Cited by the Examiner

UNITED STATES PATENTS 2,561,436   7/1951   Bachmann _____ 33—27

FOREIGN PATENTS 1,222,873   1/1960   France.
418,554   9/1934   Great Britain.

OTHER REFERENCES

Webster's New International Dictionary (2nd Edition) Copyright 1934, G. & C. Merriam Co., publishers, Springfield, Mass., page 858.

ISAAC LISANN, *Primary Examiner.*